July 15, 1958  R. W. JANETZ  2,843,404
MECHANICAL SEAL ASSEMBLY FOR ROTATING SHAFTS
Filed June 24, 1955  2 Sheets-Sheet 1

Inventor.
Ralph W. Janetz.
By
Attorney.

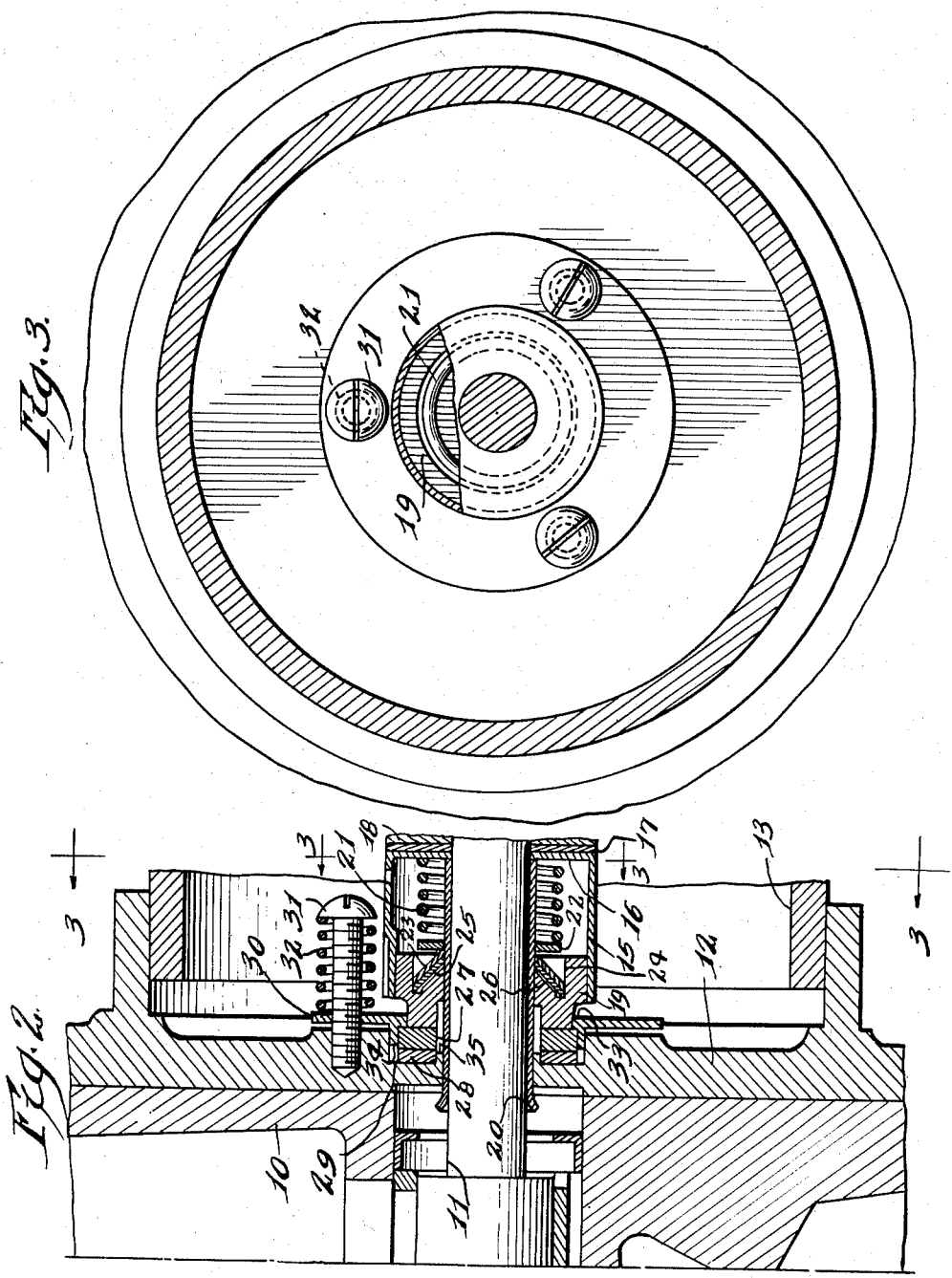

United States Patent Office 2,843,404
Patented July 15, 1958

2,843,404

MECHANICAL SEAL ASSEMBLY FOR ROTATING SHAFTS

Ralph W. Janetz, Park Ridge Manor, Ill., assignor to Bell & Gossett Company, Morton Grove, Ill., a corporation of Illinois Application June 24, 1955, Serial No. 517,826

6 Claims. (Cl. 286—11.15)

My invention relates to seal assemblies and is concerned more particularly with providing a seal for rotating shafts.

The principal object of the invention is to provide a seal assembly of the character indicated that retains liquids having a wide range of temperatures and is characterized by ruggedness during operation.

A further object is to provide a shaft seal assembly having elements which are specially adapted to provide adequate running and static seals with associated parts and are characterized by inertness to chemicals.

These and further objects of the invention will be set forth in the following specification, reference being had to the accompanying drawings, and the novel means by which the objects are effectuated will be definitely pointed out in the claims.

In the drawings:

Fig. 2 is an enlarged, sectional view of the assembly shown in Fig. 1.

Fig. 3 is a section along the line 3—3 in Fig. 2 looking in the direction of the arrows.

Figure 1:
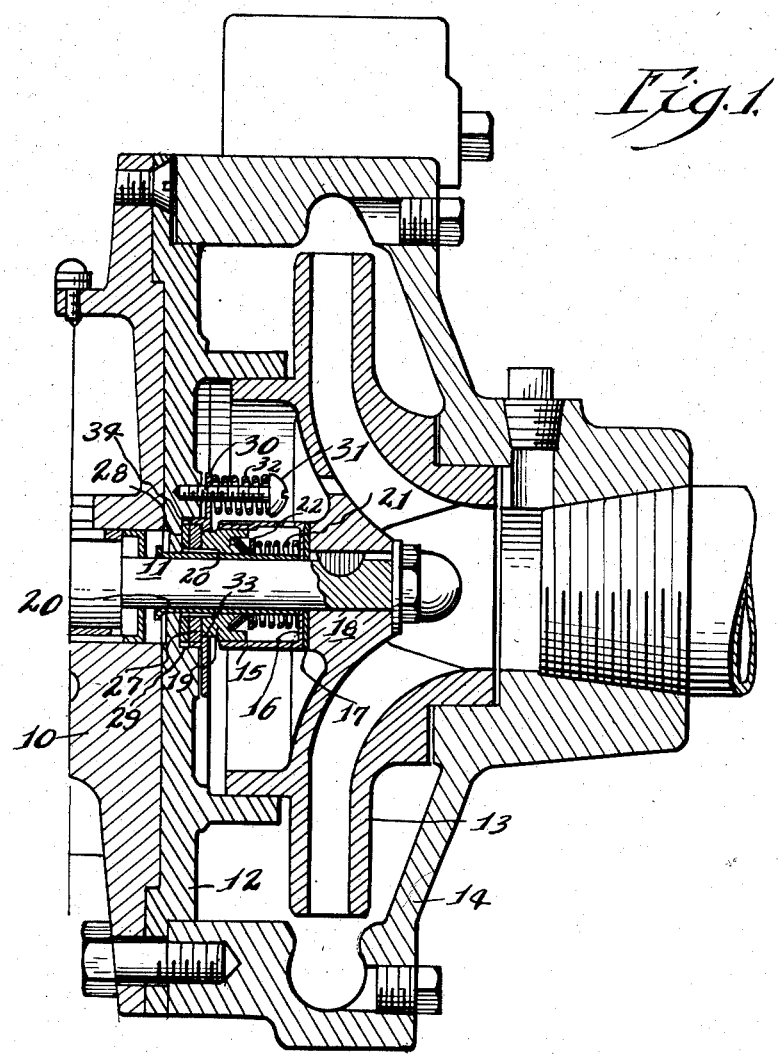
Fig. 1 is a sectional elevation of a centrifugal pump showing the application of the seal assembly thereto.

Referring to Fig. 1, the numeral 10 designates part of a bracket providing a connection with a motor support or housing (not shown) and journaled in the bracket is a motor shaft 11 which extends through a cover plate 12 attached to the end face of the bracket and is keyed to an impeller 13 operable in a volute casing 14 also bolted to the bracket, the cover plate 12 providing one end wall of the casing 14.

Between the cover plate 12 and the impeller 13, a cage 15 is tightly mounted on the shaft 11 and includes an end wall 16 in abutting relation to a sealing washer 17 that contacts the adjacent end face of the impeller hub 18. Referring to Fig. 2 which more clearly shows the seal assembly, a carbon ring 19 is slidably mounted in and rotates with the cage 15 in encircling relation to a sleeve 20 that fits the shaft 11 and is loaded for movement towards the left as viewed in Fig. 2 by a spring 21 which also encircles the shaft and is interposed between the wall 16 and a ring 22.

Under the loading of the spring 21, the inner portion of the ring 22 bears constantly against the adjacent inner portion of a frusto conical ring 23 whose lateral surface extends flaringly from the ring 22 and the outer, peripheral surface of the ring 23 fits snugly against an annular surface 24 provided by counterboring the adjacent end of the carbon ring 19. Preferably, a second ring 25, shaped like the ring 23, is nested therein with its outer peripheral surface snugly fitting the annular surface 24. Accordingly, the extension of the spring 21 is transmitted through the rings 22, 23 and 25 to and against the annular surface 24 and an annular conical seat 26 on the carbon ring 19 which forms a part of the counterbored end of the ring 19 that also includes the surface 24. The rings 23 and 25 therefore have a wedge-like relation to the carbon ring 19.

The opposite end of the ring 19 bears constantly against a ceramic ring 27 having a polished or ground surface and the latter ring bears constantly against a ring 28 which is characterized by the property of giving slightly under load and which is mounted in a recessed portion 29 of the adjacent face of the cover plate 12 that partially confines the ring 28. The rings 19, 22, 23, 25, 27 and 28 are in axial alignment and the rings 23, 25 and 28 are made from a plastic commercially known as "Teflon" and chemically identified as tetrafluoroethylene resin.

As additional loading on the rings 27 and 28 for retaining the latter in position and holding them against rotation, a plate 30 is slidably mounted in coaxial relation to the shaft 11 on a plurality of circumferentially spaced, cap screws 31 threaded in the cover plate 12, three such screws being shown in Fig. 3. Encircling each cap screw 31 between the head thereof and the plate 30 is a loading spring 32. The inner portion of the plate 30 includes an annular lip 33 which bears against the outer part of the ceramic ring 27 and extending laterally from the plate 30 is an annular shell 34 which fits the periphery of the ceramic ring 27 and the adjacent annular wall of the recess 29.

The carbon ring 19 provides a running seal with the abrasive resistant, ceramic ring 27, while the "Teflon" ring 28 provides a static seal with the cover plate 12 and the ceramic ring 27, the latter ring and the ring 28 being held against rotary movement.

A seal assembly as above is characterized by a capacity to provide a liquid seal around a rotating shaft throughout a wide range of liquid temperatures. Specifically, the temperatures may range from $-150°$ F. up to $500°$ F. The "Teflon" and ceramic rings 28 and 27, respectively, are liquid impervious and are non-corrosive to most chemicals. Where the liquid handled has corrosive properties, the other components of the pump would be composed of a non-corrosive metal, such as stainless steel.

The slight give of the "Teflon" ring 28 under the constant spring loading enables this ring to establish an adequate and intimate seal with the cover plate 12 and with the ceramic ring 27 which is harder than the "Teflon" ring, while the carbon ring 19 wears smoothly without pitting in its rubbing contact with the polished or ground and durable surface of the ceramic ring. The limited "give" or deformation of the "Teflon" ring under the spring loading occurs when the seal is first assembled in the pump; thereafter, no further deformation occurs, this ring being partially confined by an annular lip 35 defining the inward part of the recess 29.

I claim:

1. In a sealing structure, the combination of a wall member through which a rotatable shaft is adapted to extend, and sealing means adapted to encircle the shaft comprising a stationary sealing ring means adapted to abut the wall member, a rotatable sealing ring means adapted to bear against the stationary ring means, spring means for applying pressure to the rotatable ring means, pin means carried by the wall member, a plate slidable on the pin means in coaxial relation to the stationary and rotatable ring means, the plate including an annular lip bearing in an axial direction on the stationary ring means, and other spring means for applying pressure to the plate.

2. In a sealing structure, the combination of a wall member through which a rotatable shaft is adapted to extend, and sealing means comprising a stationary resinous plastic ring having a capacity for limited initial deformation under load and adapted to bear against the wall member, a stationary ceramic ring abutting the plastic ring, a carbon ring rotatable with the shaft and abutting the ceramic ring, all of the rings being axially aligned in encircling relation to the shaft, spring means for applying pressure to the carbon ring, pin means carried by the wall member, a plate slidable on the pin means in coaxial relation to the resinous, ceramic and carbon rings, the plate including an annular lip bearing in an axial direction on the ceramic ring, and other spring means for applying pressure to the plate.

3. A seal assembly for a rotating shaft adapted to extend through a wall member comprising a stationary resinous plastic ring having a capacity for limited initial deformation under load and adapted to bear against the wall member, a stationary ceramic ring abutting the plastic ring, a carbon ring rotatable with the shaft and abutting the ceramic ring, the carbon ring including a coaxial annular pocket in an end face thereof and defined by an outer cylindrical surface and inner, frustoconical surface, all of the rings being axially aligned in encircling relation to the shaft, spring means for applying pressure to the carbon ring, and wedge-acting, load transferring means interposed between the spring means and carbon ring including frustoconical ring means whose small ends are loaded by the spring means and bear against the cylindrical surface of the pocket in the carbon ring and whose inner portion seats against the frustoconical surface of the pocket in the carbon ring.

4. A seal assembly for a rotating shaft adapted to extend through a wall member comprising a stationary first ring adapted to bear against the wall member, a stationary ceramic ring abutting the first ring, a carbon ring rotatable with the shaft and abutting the ceramic ring, the carbon ring including a coaxial, annular pocket in an end face thereof and defined by an outer, cylindrical surface and inner, frustoconical surface, all of the rings being axially aligned in encircling relation to the shaft, spring means for applying pressure to the carbon ring, and annular, wedge-acting, load transferring means interposed between the spring means and carbon ring including frustoconical ring means whose small ends are loaded by the spring means and bear against the cylindrical surface of the pocket in the carbon ring and whose inner portion seats against the frustoconical surface of the pocket in the carbon ring, the first ring and wedge-acting means being composed of a resinous plastic having a capacity for limited initial deformation under load.

5. In a sealing structure, the combination of a wall member through which a rotatable shaft is adapted to extend, and sealing means comprising a stationary, resinous, plastic ring having a capacity for limited initial deformation under load and adapted to bear against the wall member, a stationary, ceramic ring abutting the plastic ring, a carbon ring rotatable with the shaft and abutting the ceramic ring, all of the rings being axially aligned in encircling relation to the shaft, spring means for applying pressure to the carbon ring, pin means carried by the wall member, a plate slidable on the pin means in coaxial relation to the plastic, ceramic and carbon rings, the plate including an annular lip bearing in an axial direction on the ceramic ring and a cylindrical shell telescoped over the periphery of the ceramic ring, and other spring means for applying pressure to the plate.

6. In a sealing structure, the combination with a casing having a wall member through which a rotatable shaft is adapted to extend, of sealing means comprising a stationary resinous plastic ring having a capacity for limited initial deformation under load for seating in sealing engagement against the wall member, a stationary ceramic ring abutting the plastic ring for seating in sealing engagement thereagainst, a carbon ring rotatable with the shaft and abutting the ceramic ring, all of the rings being axially aligned in encircling relation to the shaft, spring means for applying pressure to the carbon ring, and additional spring means reacting between the casing and said ceramic ring and loading said ceramic ring axially against said resinous plastic ring.

References Cited in the file of this patent

UNITED STATES PATENTS

| | | |
|---|---|---|
| 2,352,636 | Jackman | July 4, 1944 |
| 2,395,705 | Wool | Feb. 26, 1946 |
| 2,425,209 | Snyder et al. | Aug. 5, 1947 |
| 2,653,837 | Voytech | Sept. 29, 1953 |
| 2,785,913 | Solari | Mar. 19, 1957 |

FOREIGN PATENTS

| | | |
|---|---|---|
| 695,087 | Great Britain | Aug. 5, 1953 |